US005213191A

United States Patent [19]

Tahara et al.

[11] Patent Number: 5,213,191

[45] Date of Patent: May 25, 1993

[54] VERTICALLY MOVABLE STAIRCASE

[75] Inventors: Susumu Tahara; Satoshi Nakagawa; Misayo Nakamura, all of Kadoma, Japan

[73] Assignee: Matsushita Electric Works, Ltd., Osaka, Japan

[21] Appl. No.: 887,047

[22] Filed: May 22, 1992

[51] Int. Cl.$^{5}$ .......... B65G 21/18

[52] U.S. Cl. .......... 198/328; 198/778

[58] Field of Search .......... 198/321, 324, 328, 778

[56] References Cited

U.S. PATENT DOCUMENTS

| | | | |
|---|---|---|---|
| 782,009 | 2/1905 | Dodge | 198/328 X |
| 807,565 | 12/1905 | Lorillard | 198/328 X |
| 967,710 | 8/1910 | Bennett | 198/328 X |
| 3,878,931 | 4/1975 | Luna | 198/328 |
| 4,434,884 | 3/1984 | Kettle | 198/328 |
| 4,768,621 | 9/1988 | Kunii | 187/25 |
| 4,828,099 | 5/1989 | Dexter, Jr. | 198/324 |

FOREIGN PATENT DOCUMENTS

| | | | |
|---|---|---|---|
| 0125715 | 11/1984 | European Pat. Off. | 198/778 |
| 3301397 | 7/1984 | Fed. Rep. of Germany | 198/328 |
| 3723339 | 1/1989 | Fed. Rep. of Germany | 198/778 |
| 1268505 | 11/1986 | U.S.S.R. | 198/328 |

*Primary Examiner*—Robert P. Olszewski
*Assistant Examiner*—James R. Bidwell
*Attorney, Agent, or Firm*—Burns, Doane, Swecker & Mathis

[57] ABSTRACT

A vertically movable staircase carries on a vertical pillar a plurality of steps sequentially secured to the pillar along a spiral line thereon, the pillar being vertically moved while being axially rotated by a driving device. The staircase is space saving and simple in structure.

8 Claims, 9 Drawing Sheets

VERTICALLY MOVABLE STAIRCASE

BACKGROUND OF THE INVENTION

This invention relates to a vertically movable staircase and, more particularly, to a staircase having a series of spirally arranged steps for axial rotation and simultaneous vertical motion about a vertical pillar.

This vertically movable staircase should find its utility when installed between upstairs and downstairs in general housing for transporting every passenger or even a plurality of passengers simultaneously.

DESCRIPTION OF RELATED ART

In general housing, contributive to people's movement between the upstairs and downstairs is a linear or corkscrew staircase. For the aged or physically handicapped, however, the use of such staircase is a salient burden, and the use of a small elevator or escalator system is becoming popular.

While there has been suggested in, for example, U.S. Pat. No. 4,768,621 to K. Kunii a compact elevator system for use in private homes, it has been required to install the system in conjunction with the staircase preferably side by side for permitting emergency escape upon occurrence of fire or the like so that there arises a problem in requiring an excessively large space for their installation. In the case of the escalator, on the other hand, the escalator in its stationary state may be utilized as a staircase so that no additional staircase will be required, but the escalator system has a structure which is complicated enough to render the system expensive. In another U.S. Pat. No. 4,434,884 to J. L. Kettle, for example, there has been suggested a spiral escalator including steps respectively provided for movement along a spiral path defined by tracks secured around a supporting pillar so that the required space for the installation can be minimized, but the structure has been still complicated enough for keeping the system expensive.

SUMMARY OF THE INVENTION

A primary object of the present invention is therefore to provide a vertically movable staircase which is simple enough in structure to be inexpensive and is capable of minimizing the required space for installation.

According to the present invention, this object can be realized by means of a vertically movable staircase having a plurality of steps secured along a spiral line about a vertical pillar, wherein a driving means is provided for vertically moving the pillar while axially rotating the same.

Other objects and advantages of the present invention shall become clear as following description of the invention advances with reference to embodiments shown in accompanying drawings.

Figure 1:
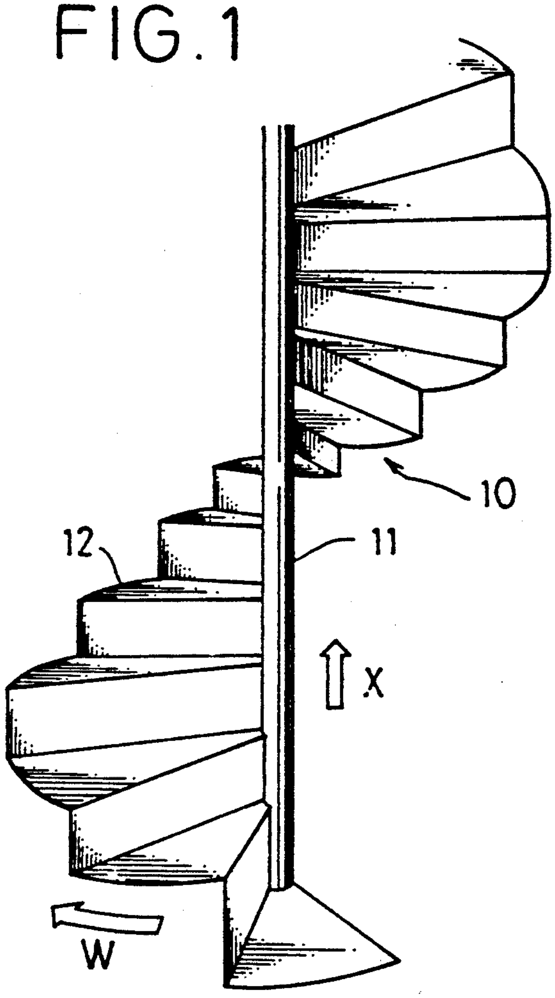
FIG. 1 is a schematic elevation view of a vertically movable staircase in a first embodiment according to the present invention.

While the present invention is to be described in the followings with reference to the embodiments shown in the drawings, it should be appreciated that the intention is not to limit the invention only to these embodiments shown but is to rather include all alterations, modifications and equivalent arrangements possible within the scope of appended claims.

DETAILED DESCRIPTION OF THE PREFERRED EMBODIMENTS

Referring to FIG. 1, there is shown a vertically movable staircase 10 which generally comprises a vertical pillar 11 and a corkscrew or spiral stairway 12 formed by a plurality of steps secured to the pillar 11 sequentially along a spiral line on the same. In this case, the pillar 11 and stairway 12 are formed to be of the height substantially corresponding, when the staircase 10 is used in two-storied houses, to a full two-story height or, when used in three-storied houses, to a full three-story height of the houses, and so on. The spiral characteristics, i.e., spirality, of the stairway are such that the spiral is advanced by one pitch for one floor height.

Figure 3:
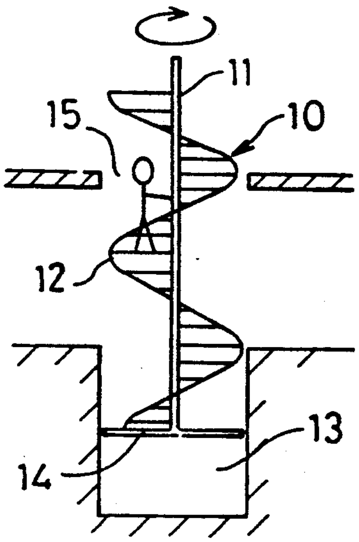
Figure 4:
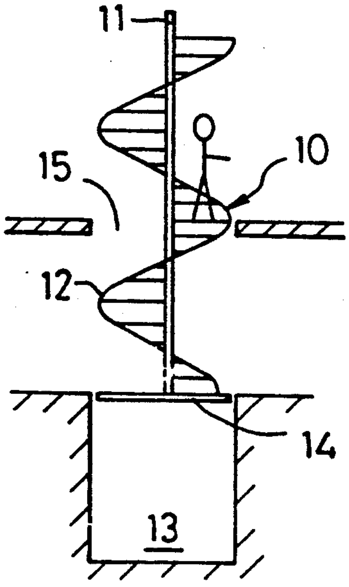

Further, in installing the staircase 10, in practice, there is provided a recess 13 extending downward from the first or ground floor surface to be of a depth substantially corresponding to the one floor height and to be of a diameter slightly larger than that of the spiral stairway 12, so that a lower end of the staircase 10 where a base plate 14 is secured to the vertical pillar 11 preferably can be seated at the bottom of the recess 13. In the upstairs floor surface, an aperture 15 is formed to be of a diameter slightly larger than that of the spiral stairway 12. The staircase 10 thus installed upright through the downstairs recess 13 and upstairs aperture 15 is coupled to such a driving means which imparts concurrent rotary and vertical movement as will be detailed later with reference to FIGS. 5 to 8, so that the staircase 10 will be moved, with a passenger or passengers carried on the stairway 12, upward from the lowermost position of FIG. 2 through a transitional position of FIG. 3 to the uppermost position FIG. 4 while being rotated preferably clockwise (i.e., in the direction of an arrow W) and elevated in a direction of an arrow X in FIG. 1, or downward from the uppermost position of FIG. 4 to the lowermost position of FIG. 2 while being rotated and lowered in opposite directions. Such vertical movement is normally set to be of a stroke length which corresponds to the one floor height.

Figure 2:
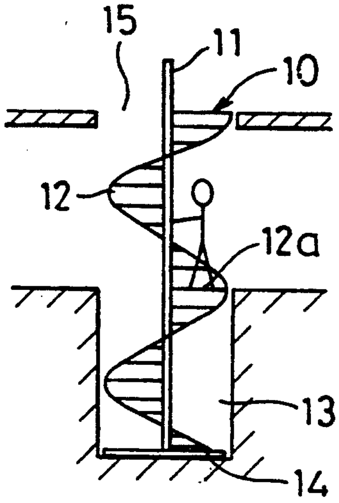
FIGS. 2 to 4 are schematic elevational views for the operation of the staircase in FIG. 1, respectively in different state of the operation.

Now, provided that the passenger steps on a step 12*a* at one pitch from the lower end of the staircase shown in FIG. 2 and the driving means 20 for the vertical and rotary motion of the staircase 10 is actuated, the step 12*a* and the passenger thereon can be shifted up to a position level with the upstairs floor, i.e., corresponding to a position on the downstairs floor where the passenger has stepped on the step 12*a*. When the passenger intends to descend from the upstairs to the downstairs, the passenger is only required to perform the operation in the opposite way. Further, in the case where the staircase 10 is installed in a building of more than three stories, the passenger who intends to use this movable staircase 10 between the first (ground) floor and the third or higher floor may only be required, prior to stepping onto the stairway 12, to have the lower end of the vertical shaft 11 seated at the bottom of the recess 13 and then to perform the foregoing operation. In a state where the driving means is stopped, on the other hand, the staircase 10 may be utilized simply as an ordinary spiral staircase. Even when the driving means is arbitrarily caused to stop during an emergency such as a fire or earthquake occurrence, one of the steps forming the spiral stairway 12 is made to be positioned substantially in correspondence to either the downstairs or the upstairs floor surface, and the staircase 10 in the suspended state can be utilized as the ordinary spiral stairway for smooth and safe escape.

Figure 5:
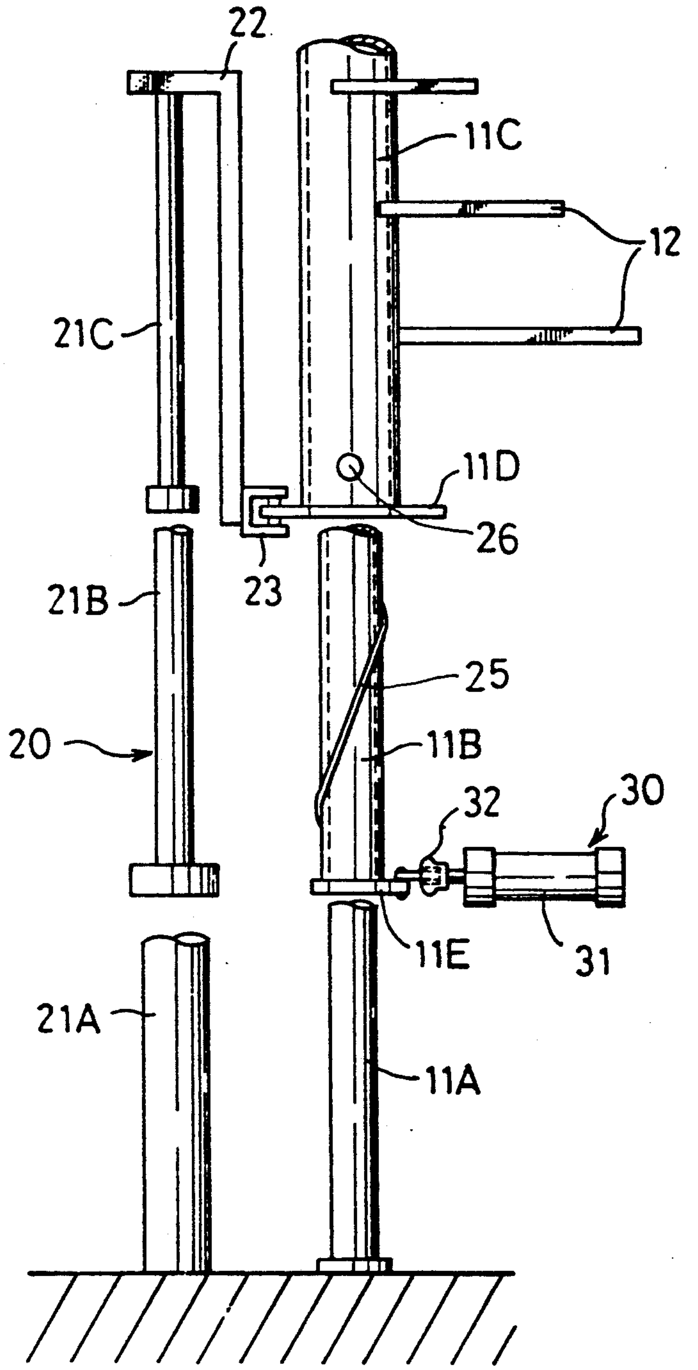
FIGS. 5 and 6 are elevational views of different states of operation of a driving means for realizing vertical and rotary motion of the staircase in FIG. 1.
Figure 6:
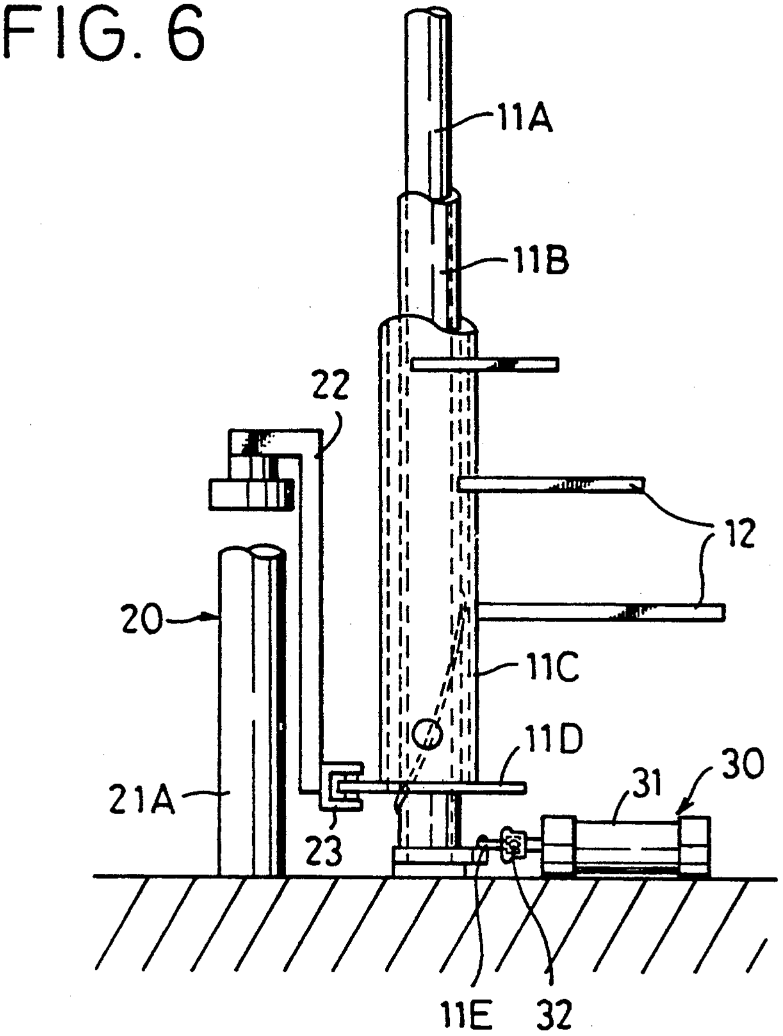

More specifically, the vertical pillar 11 comprises a plurality (in the present instance, three) of tubular shafts 11A, 11B and 11C mutually of different diameters, as shown in FIGS. 5 and 6, such that 11A<11B<11C to be relatively slidably inserted in one another so that the tubular shafts 11A, 11B and 11C will take respectively the innermost, intermediate and outermost positions of a telescopic movement so as to render the entire length of the vertical pillar 11 to be extended or shortened. In this case, the outermost tubular shaft 11C of the largest diameter is made to be of a length substantially corresponding to the N-story height space and is peripherally provided with the steps forming the stairway 12 substantially corresponding to the full N-story height. The innermost and intermediate tubular shafts 11A and 11B are so provided that their total length substantially corresponds to the depth of the recess 13. Further, while the innermost and intermediate tubular shafts 11A and 11B are provided for relative movement only in axial directions by means of a spline coupling, for example, the intermediate and outermost tubular shafts 11B and 11C are provided for relative movement in both the axial directions and rotating directions about the axis.

Figure 9:
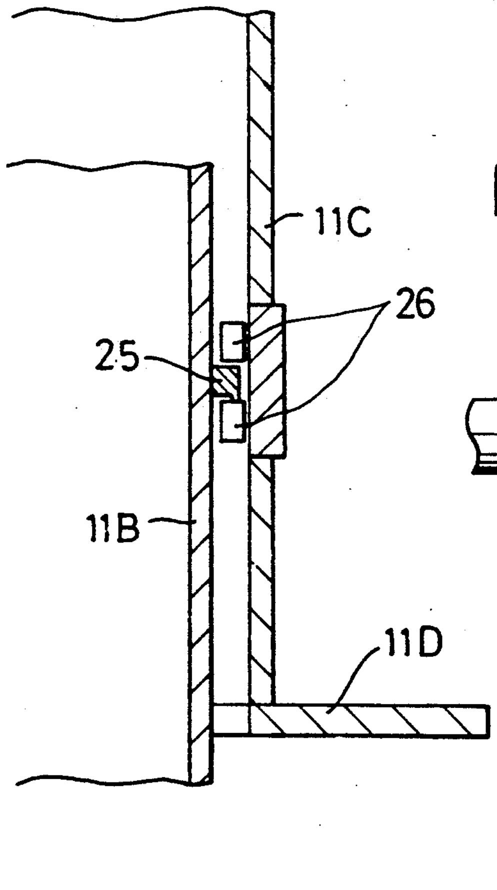
FIG. 9 is a fragmentary sectioned view of a vertical pillar in the staircase shown in FIG. 1.
Figure 8:
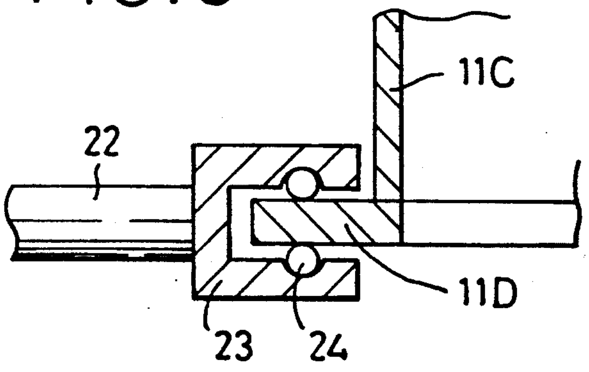
FIG. 8 is a fragmentary sectioned view of the driving means in the aspect shown in FIG. 7.

On the other hand, the driving means 20 for the vertical and rotary motion of the staircase 10 comprises a drive rod telescopically expanded and contracted under application of an oil pressure, for example, and this drive rod is also formed with three divisions of activator tubes 21A to 21C having respectively a length corresponding to that of the respective tubular shafts 11A to 11C forming the vertical pillar 11, preferably. These activator tubes 21A to 21C are also inserted in one another for relative sliding so that the entire length of the drive rod will be varied to expand and contract in response to increments and decrements in the oil pressure from an oil pressure source (not shown). At the top of this driving rod, an end of a link arm 22 is secured. This link arm 22 is bent into L-shape to extend downward, and a joint 23 connectable to a lower end flange 11D of the outermost tubular shaft 11C is secured to the downward extended end of the link arm 22. As will be seen in FIGS. 7 and 8, this joint 23 is U-shaped so as to hold between parallel arms of the U-shape the flange 11D through bearing balls 24 disposed on both surfaces of the flange OLD, for allowing the flange OLD to be smoothly rotated about the axis of the vertical pillar 11 and within the joint 23. In addition, the intermediate tubular shaft 11B is provided on its outer periphery with a spiral guide rail 24 extending along the length of the shaft, while the outermost tubular shaft 11C has a guide follower having a pair of inward extended projections 26 as shown in FIG. 9 for engagement with the spiral guide rail 25. As the outermost tubular shaft 11C is vertically moved by the driving rod through the link arm 22, the projections 26 and the follower as well are guided along the spiral rail 25, and the outermost tubular shaft 11C can execute one axial rotation.

Figure 10:
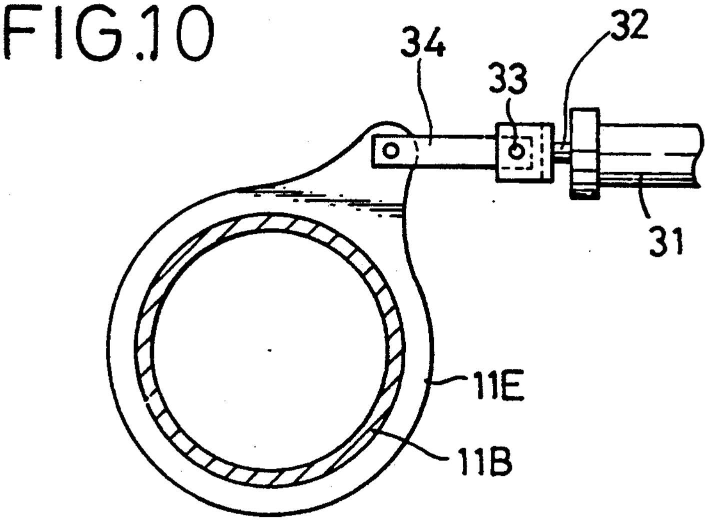
FIGS. 10 and 11 are plan views of mutually different operation of a turning means for a matching operation as employed in the staircase shown in FIG. 1.
Figure 11:
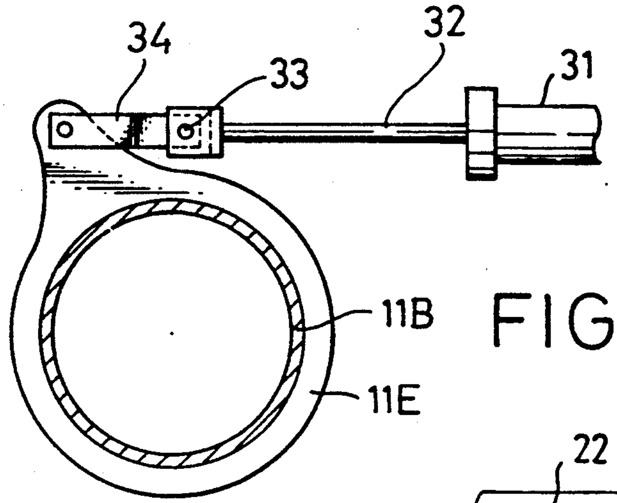
Figure 7:
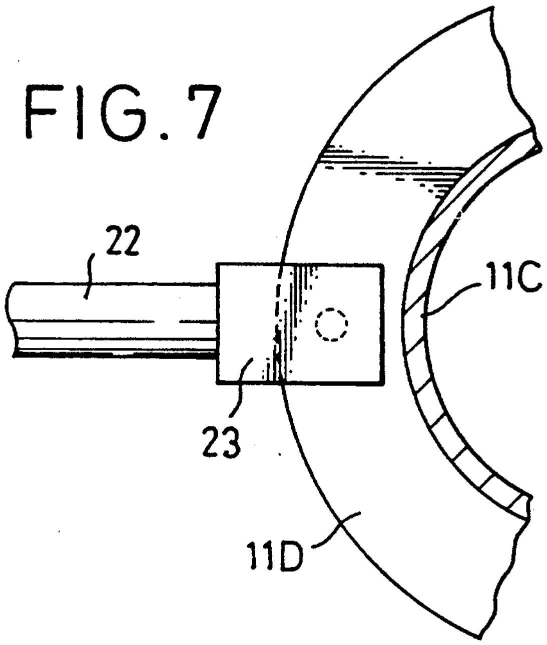
FIG. 7 is a fragmentary plan view of another working aspect of the driving means shown in FIGS. 5 and 6.

Referring also to FIGS. 10 and 11 in conjunction with FIGS. 5 and 6, the staircase 10 further comprises a matching means 30 for rendering the staircase 10 to be utilizable always at a fixed position of either the downstairs or the upstairs. This matching means 30 comprises an actuator 31 acting as a turning means. An actuating rod 32 of the actuator 31 is interlocked through a joint 33 to an interlocking rod 34 pivoted to a lower end flange 11E of the intermediate tubular shaft 11B. As this actuator 31 is operated, the actuating rod 32 is caused to project and retract for a predetermined stroke, whereby the intermediate tubular shaft 11B is caused to attain a relative turning at a predetermined angle with respect to the outermost tubular shaft 11C. Accordingly, this matching means 30 can be operated by an optimum manual or automatic controller (not shown here), for example, at the time when the staircase 10 is stopped after completion of the vertical shift of the passenger to cause the intermediate tubular shaft 11B to be returned always to an identical position, and eventually the outermost tubular shaft 11C (which is interlocked to the intermediate tubular shaft 11B through the spiral guide rail 25 and follower projections 26) is also reset always to the identical position.

Since this matching means 30 allows the predetermined one of the steps forming the stairway 12 to be disposed constantly at a fixed position relative to the downstairs or upstairs floor surface, it is enabled to reliably match this particular step to a position of a gateway if provided at each of the downstairs and upstairs with respect to the staircase 10. So long as the spiral guide rail 25 on the periphery of the intermediate tubular shaft 11B, and the inward follower projections 26 of the outermost tubular shaft 11C for engaging with the rail 25 are manufactured with high precision, the disposition of the predetermined step of the stairway 12 constantly at the identical position may be eventually attained. It will be appreciated, however, that cumbersome working steps required for such high precision manufacture and eventual high manufacturing costs taken into account will justify the use of such matching means as in the above to be extremely advantageous.

In addition, the foregoing matching means 30 also performs a function of restricting the intermediate tubular shaft 11B from axially rotating during the vertical movement with concurrent rotation of the outermost tubular shaft 11C. Further, the matching means 30 can be also arranged for resetting to the original position even when the staircase 10 is arbitrarily stopped upon the fire or earthquake occurrence. The driving means 20 may be properly installed on the bottom of the recess 13, while the matching means 30 is secured to an optimum supporter (not shown) which is extendable and retractable for following the vertical movement of the intermediate tubular shaft 11B with respect to the bottom of the recess 13.

In addition, when any excessive load or shock is given to the staircase 10 in axial direction of the vertical pillar 11, the spline coupling between the innermost and intermediate tubular shafts 11A and 11B for their mutual axial movement can effectively absorb such load or shock. When any impact is given to the staircase 10 in the rotating direction about the axial direction, such impact may be effectively absorbed by the matching means 30.

Figure 12:
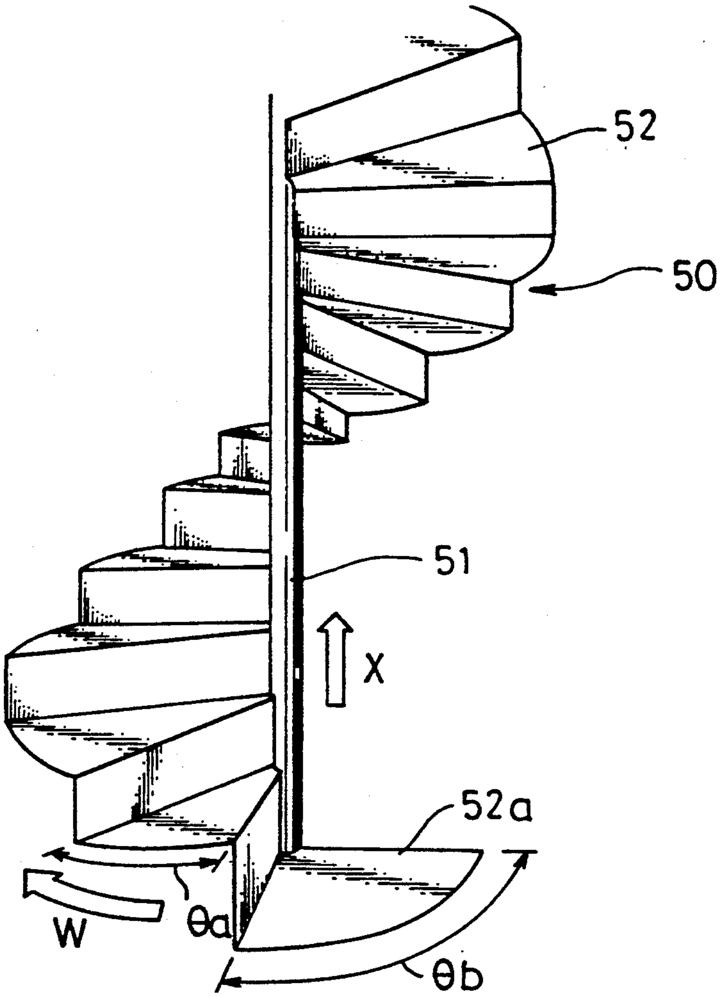
FIG. 12 is a schematic elevational view of a vertically movable staircase in a second embodiment according to the present invention.
Figure 13:
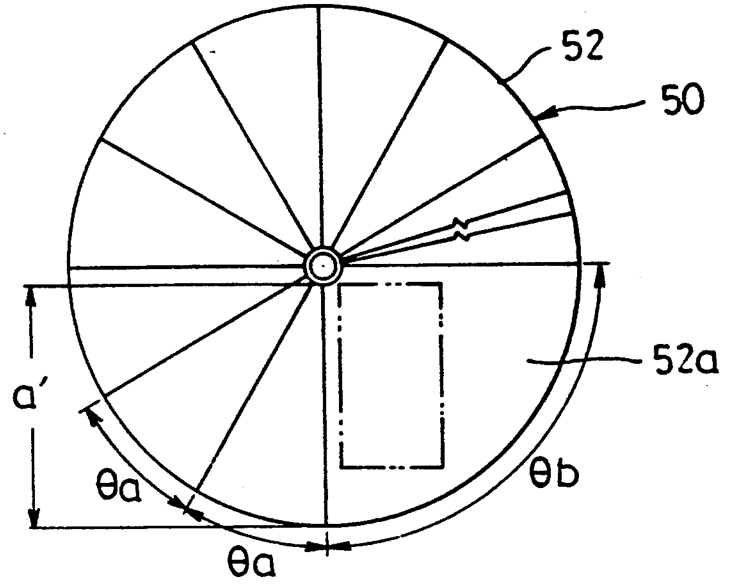
FIG. 13 is a schematic plan view of the staircase shown in FIG. 12.

Referring next to FIG. 12, there is shown a second embodiment of the vertically movable staircase according to the present invention, in which the same and equivalent constituent elements as those in the first embodiment of FIG. 1 are denoted by the same reference numerals but with an addition of 40 as those used in FIG. 1. In the present instance, as will be clear when FIG. 13 is concurrently referred to, a first step 52*a* of the stairway is provided to be large enough for loading in particular a wheelchair as it is. That is, while other steps than the first step 52*a* are made to form a rotary angle $\theta$a, the first step 52*a* forms a rotary angle $\theta$b which is, for example, three times as large as the angle of the other steps. Other constituting elements are the same as those in the foregoing embodiment and can be made to function in the same manner, but the use of the matching means 30 in the first embodiment for the constant positioning of the first step 52*a* should be particularly useful. In FIGS. 14 to 17 showing the operation of the staircase 50, the numerals given to the steps forming the stairway 52 denote the number of the steps with the first wide step 52*a* numbered as "1".

Figure 14:
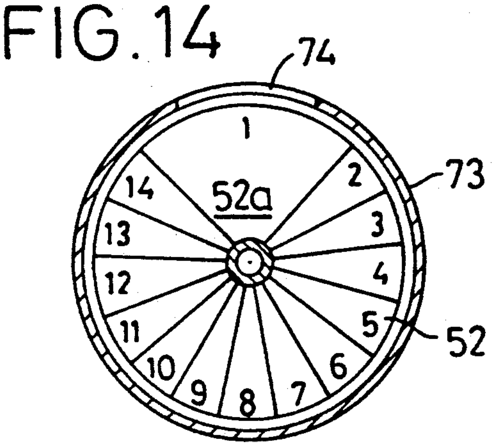
FIGS. 14 to 17 as well as FIGS. 18 to 21 are respectively schematic explanatory plan and side views depicting the operation of the staircase shown in FIG. 12.
Figure 15:
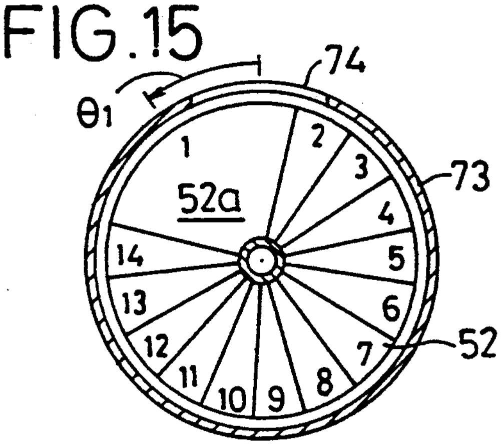
Figure 16:
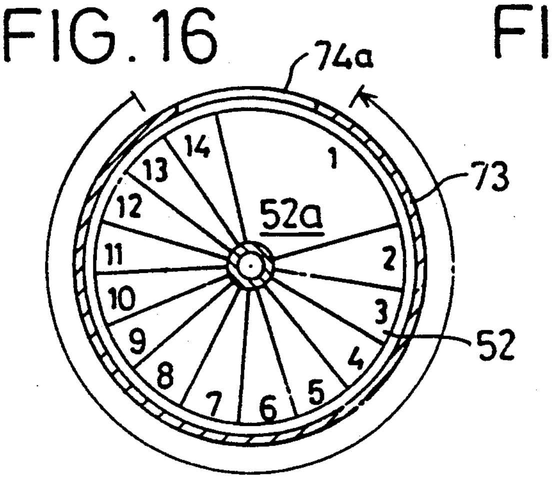
Figure 17:
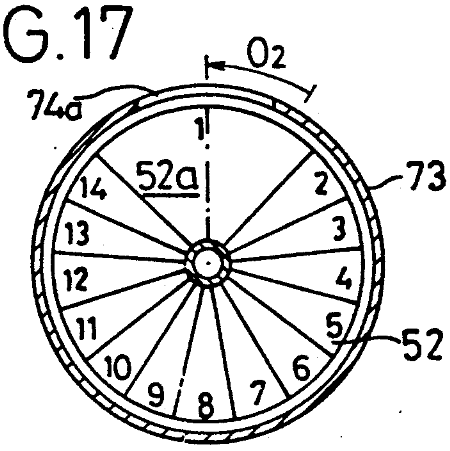
Figure 18:
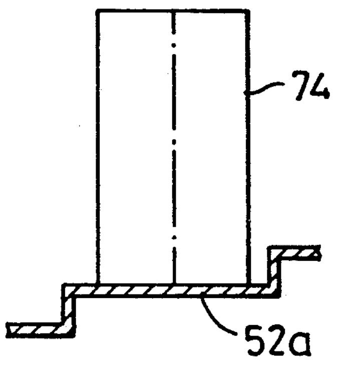
Figure 19:
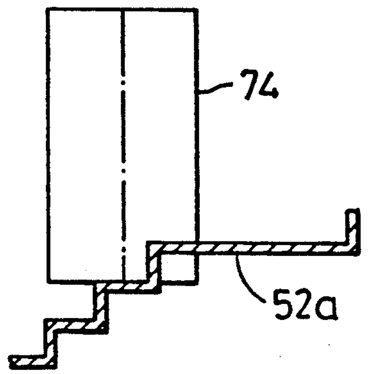
Figure 20:
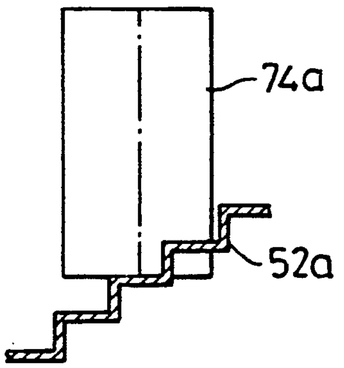
Figure 21:
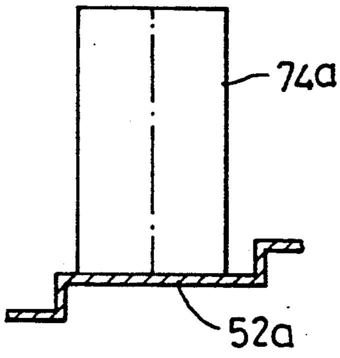

Now, when the passenger intends to go up from the downstairs to the upstairs, the passenger steps through a downstairs gateway 74 of a housing 73 optimumly surrounding the staircase 50 onto the first step 52*a* disposed in match with the gateway 74, as shown in FIG. 14 as well as FIG. 18, and first actuates the actuator of the matching means, and then the outermost tubular shaft of the vertical pillar is rotated to have the stairway 52 rotated as shown in FIG. 15 by a rotary angle corresponding to an advancing stroke of the foregoing actuator rod of the actuator. While this rotary angle $\theta 1$ is 32.5°, for example, no relative rotation takes place between the outermost and intermediate tubular shafts 11C and 11B, and the outermost tubular shaft 11C carrying the stairway 52 is still not caused to be elevated during this rotation. Then, the matching means is placed in a stopped state and the foregoing vertically and rotary driving means is actuated, whereby the outermost tubular shaft 11C is rotated relative to the intermediate tubular shaft 11B, so that the outermost tubular shaft 11C carrying the stairway 52 will be elevated while being axially rotated from the position of FIG. 15 to another position of FIG. 16. As the stairway 52 reaches the position of FIG. 16 where the first step 52*a* is close to a fully matching position with an upstairs gateway 74*a* of the staircase housing 73, the vertically and rotary driving means is stopped but the matching means is actuated again, so that the outermost tubular shaft 11C carrying the stairway 52 will be axially rotated by a predetermined angle from the position of FIG. 16 to a position shown in FIG. 17, which angle $\theta 2$ is also set to be 32.5°, for example, and the first step 52*a* comes into fully matching relationship with the upstairs gateway 74*a* so as to allow the passenger to be easily loaded on or off with respect to the staircase 50.

In an event where the staircase 50 is caused to be stopped arbitrarily due to the occurrence of fire, earthquake or the like, there arises a risk that the first or selected one step of the stairway 52 is out of matching relationship with the gateway 74 or 74*a* of the staircase housing 73. However, the arrangement may be so adapted to such risk that the matching means is actuatable with a power from a battery provided as an energy source for emergency-use, whereupon at least one of the steps forming the stairway 52 is thereby brought into match with the downstairs or upstairs gateway 74 or 74*a*, and the staircase 50 may be utilizable just as an ordinary stairway to accommodate the passenger's escape.

Figure 22:
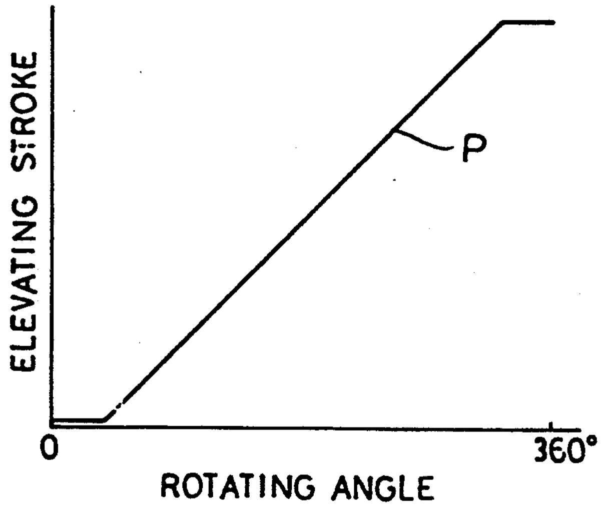
FIG. 22 shows in a diagram the relationship between the elevating stroke and rotating angle of part of the vertical pillar in the staircase of FIG. 12.

In FIG. 22, there is shown diagramatically the relationship between the elevating stroke and the rotating angle of the outermost tubular shaft 11C by the driving means during the foregoing operation in the optimum working aspect of the present invention.

In the foregoing arrangement, further, it may be possible to adopt various design modifications. For example, the housing defining the operating zone, i.e., the installation space of the vertically movable staircase 50 described with reference to FIGS. 14 to 17 can be also adopted in the first embodiment described with reference to FIGS. 1 to 11, so that the housing will be installed to penetrate through the downstairs and upstairs or total full floor height, and the entire staircase structure can be thereby improved in strength. Provided here that the housing is formed with a transparent plastic material or any other see-through structure, the staircase of the present invention allows the passenger to utilize the same without any fear of being kept in a closed place, or while having a feeling of being in an open or wide space, though the recess upon the upward shift of the staircase or a corresponding part in the topmost floor upon the downward shift thereof will be a dead space. The arrangement may be so made that an optimum sensor can detect any mismatching between the axial rotary position of the vertical shaft or staircase and the gateways of the housing, This detection output is provided to the matching means, and the predetermined step, in particular, whereby the first step of the stairway will be brought into match with the gateway of the housing. Further, instead of the oil pressure actuation, the driving and matching means may be actuated with any one of various energy sources, such as an electric motor and the like. It is also desirable to adopt an arrangement that, upon such emergency as fire, earthquake or the like, the energy being applied to the driving means is automatically removed and the staircase 10 or 50 is reset to the starting position.

Figure 23:
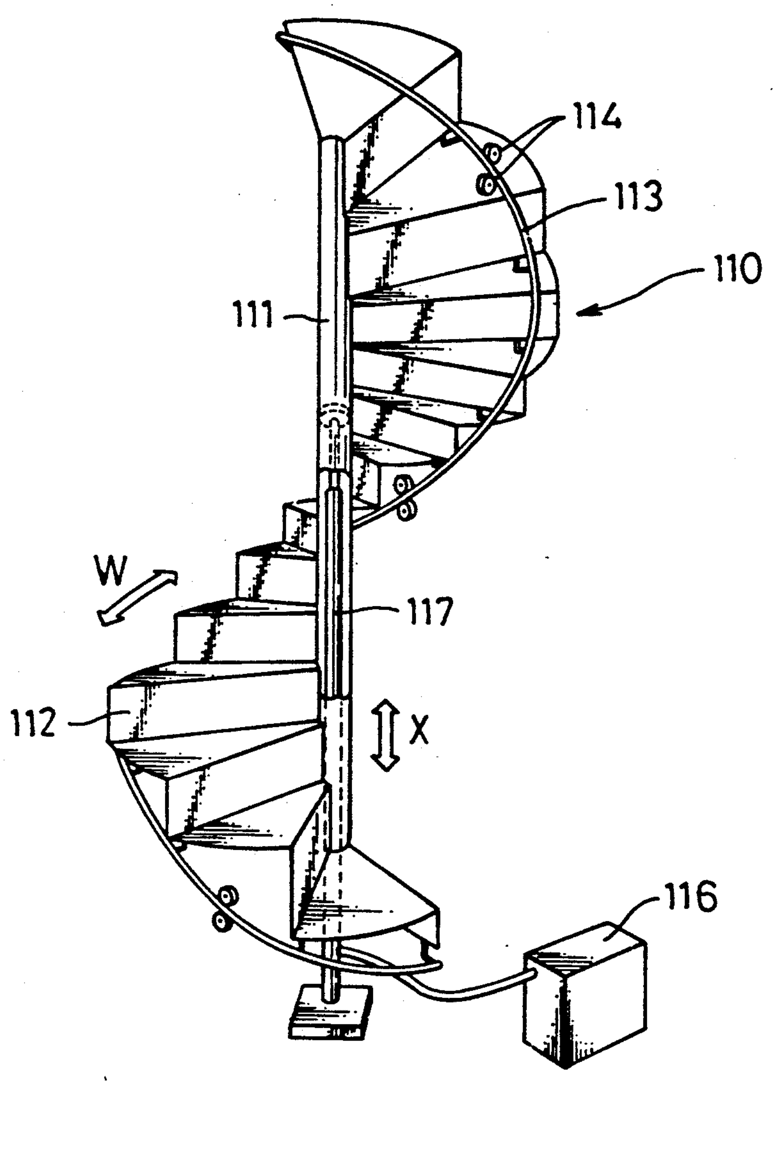
FIGS. 23 and 24 are schematic elevational views in other working aspects of the driving means employed respectively in the first and second embodiments of the staircase shown in FIGS. 1 and 12.
Figure 24:
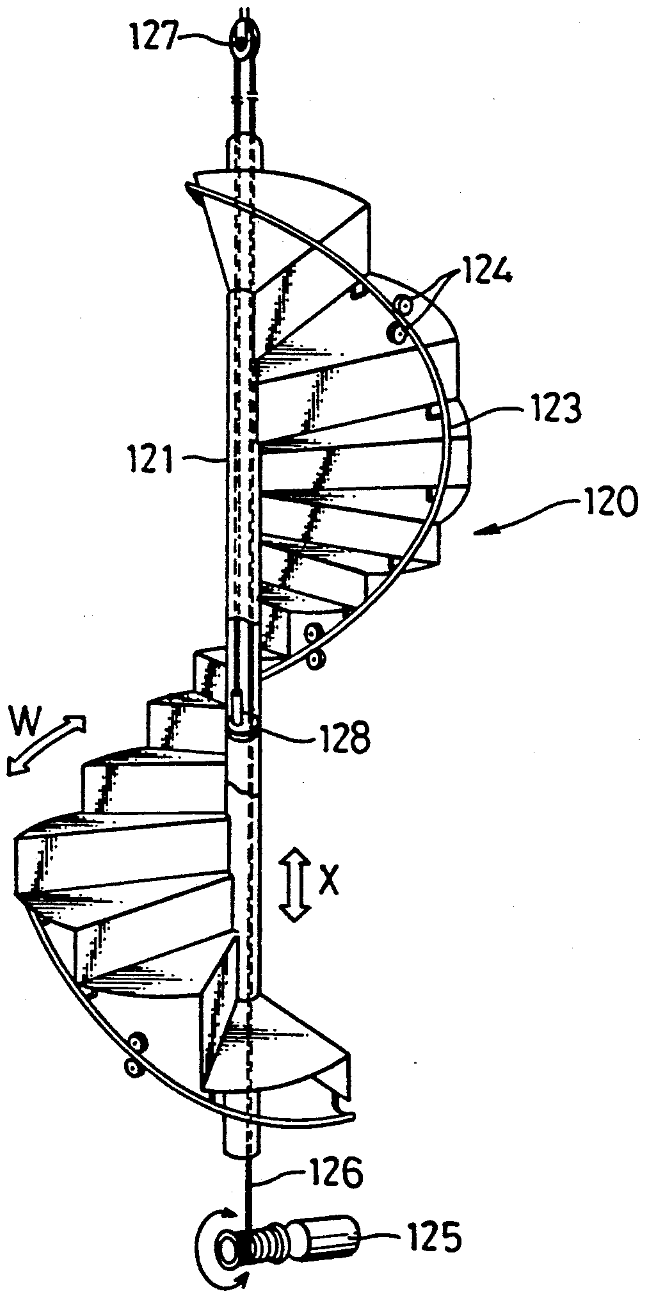

For the vertical and rotary driving means, in addition, there may be adopted such other arrangements that, as shown in FIG. 23, the vertical pillar 111 of the staircase 110 is provided with a spiral guide rail 113 and rolls 114 for rolling along the guide rail 113 so as to have the pillar 111 and stairway 112 moved vertically while being rotated along the spiral guide rail 113 with an oil-pressure cylinder 117 provided within the vertical pillar 111 and actuated by means of a compressor unit 116. Alternatively, as shown in FIG. 24, the vertical pillar 121 of the staircase 120 is provided with a spiral guide rail 123 and rolls 124 for rolling along the guide rail 123 so as to have the pillar 121 and stairway 122 moved vertically while being rotated along the spiral guide rail 123 with a wire 126 wound on and paid out of a drum of a motor 125 and coupled through a pulley 127 on a ceiling or the like of the building to a hanging plate 128 within the pillar 121 as the motor 125 is rotated normally or reversely.

What is claimed is:

1. A vertically movable staircase comprising a vertical pillar, a plurality of stairway steps secured along a spiral line on the periphery of said vertical pillar, and a driving means including means for vertically moving said pillar and means for axially rotating the pillar.

2. The staircase according to claim 1 wherein said stairway steps are provided in correspondence to the number of stories of a building with respect to which the staircase is installed, and there to be one pitch in the spirality for every floor in the building.

3. The staircase according to claim 2 wherein there is provided a recess at least at one of the spaces above and below said vertical pillar for securing a length of said pillar corresponding to that of said one pitch of said spirality.

4. The staircase according to claim 2 wherein a first one of said stairway steps for said one pitch of the spirality is made wider than the other steps.

5. The staircase according to claim 1 wherein said vertical pillar is divided into a plurality of tubular shafts which are mutually telescopically coupled to be projected and contracted, said stairway steps being provided at the outermost positioned tubular shaft of said pillar, and said tubular shafts are provided for expansion and contraction in response to vertical motion of said vertically moving means which is expansible and contractible.

6. The staircase according to claim 5 which further comprises means disposed between said outermost tubular shaft and the innermost positioned one of the other tubular shafts for axially rotating the outermost tubular shaft.

7. The staircase according to claim 6 wherein said rotating means comprises a spiral guide rail provided on said innermost positioned one of the other tubular shafts, and follower projections provided on inner peripheral surface of the outermost tubular shaft to be engageable with said guide rail.

8. The staircase according to claim 6 which further comprises means for turning said outermost positioned tubular shaft and inner positioned other tubular shafts relative to each other by a predetermined rotary angle.

* * * * *